US008258968B2

(12) United States Patent
Ghazarian et al.

(10) Patent No.: US 8,258,968 B2
(45) Date of Patent: Sep. 4, 2012

(54) REMOTE TRANSPONDER BREATHALYZER

(76) Inventors: Viken Der Ghazarian, Bell Canyon, CA (US); Ohannes Der Ghazarian, Henderson, NV (US)

( * ) Notice: Subject to any disclaimer, the term of this patent is extended or adjusted under 35 U.S.C. 154(b) by 519 days.

(21) Appl. No.: 12/378,151

(22) Filed: Feb. 11, 2009

(65) Prior Publication Data
US 2009/0201138 A1     Aug. 13, 2009

Related U.S. Application Data

(60) Provisional application No. 61/065,420, filed on Feb. 12, 2008.

(51) Int. Cl.
*G08B 23/00*     (2006.01)
(52) U.S. Cl. .................... 340/576; 340/426.12; 73/23.2
(58) Field of Classification Search ............. 340/426.12, 340/426.24, 576, 627, 572.1, 573.1; 180/272; 73/23.2; 600/300, 301, 316
See application file for complete search history.

(56) References Cited

U.S. PATENT DOCUMENTS

| 4,996,161 | A | * | 2/1991 | Conners et al. | ............... 436/132 |
| 6,748,792 | B1 | * | 6/2004 | Freund et al. | .................. 73/23.3 |
| 7,481,292 | B2 | * | 1/2009 | Mobley et al. | ................. 180/272 |
| 7,658,255 | B2 | * | 2/2010 | Nordin | ........................... 180/272 |
| 2005/0212653 | A1 | * | 9/2005 | Hertel et al. | .................. 340/5.22 |
| 2005/0230175 | A1 | * | 10/2005 | Brown et al. | ................. 180/272 |
| 2006/0173256 | A1 | * | 8/2006 | Ridder et al. | ................. 600/316 |
| 2006/0182661 | A1 | * | 8/2006 | Aquila | ............................. 422/84 |
| 2006/0253711 | A1 | * | 11/2006 | Kallmann | ..................... 713/186 |
| 2012/0004031 | A1 | * | 1/2012 | Barney et al. | .................. 463/31 |

* cited by examiner

Primary Examiner — Eric M Blount
(74) Attorney, Agent, or Firm — LeonardPatel PC

(57) ABSTRACT

Hand held Remote Transponder Breathalyzer comprises of a portable breathalyzer device having a breath sensor circuitry used for converting given breath sample content into electronic signals; and a processor for storing a toxic breath setting and processing received conditioned electronic signals, and for comparing the received electronic conditioned signals with a preset threshold setting stored in the memory storage of the processor, and accordingly controlling the functional operation of a uniquely coded transponder circuitry.

If given breath sample into the transponder breathalyzer sensor generated electronic conditioned signal is below toxic breath setting threshold. The processor upon receipt of the non-toxic electronic signal transmits a signal to activate for a preset time the functional operation of the transponder circuitry.

In a preferred embodiment of the present invention the Remote Transponder Breathalyzer additionally utilizes a voice recognition method, accordingly only given user be able to operate the Remote Transponder Breathalyzer.

18 Claims, 2 Drawing Sheets

BLOCK DIAGRAM

REMOTE TRANSPONDER BREATHALYZER

CROSS-REFERENCE TO RELATED APPLICATION:

The currently pending application claims priority to U.S. Provisional Patent Application No. 61/065,420, which was filed on Feb. 12, 2008. The subject matter of the above-referenced Provisional Patent Application is incorporated herein by reference in its entirety.

BACKGROUND OF INVENTION

The present invention relates to a RFID Breathalyzer Tag or key fob system for remotely controlling various electronic devises, and more particularly to a remote control system for remotely controlling such as, Automobile or aircraft Ignition interlock devises or any industrial machinery by way of breath sample given by the operator into said RFID Breathalyzer transponder tag.

In recent years various RFID transponder Tags is been used in many different application such as door openers, access controls, deactivating car Alarm devices, engine interlock, traffic tollbooths Etc. To control the operation of various electronic devise.

In addition Hand Held breathalyzer units is been used by police officers to test suspected drunk drivers, to determine if an operator of a vehicle is intoxicated or driving above state B.A.C. limits.

In recent years vehicle installed breath alcohol ignition Interlock system is been used to prevent a vehicle from being started unless the operator passes a breath sobriety test by use of vehicle installed Breathalyzer device.

It is the primary objective of the present invention using a remote hand held breathalyzer designed to control functional operation of the RFID transponder tag located within the portable breathalyzer to enable the RFID Transponder upon interrogation to communicate with a vehicle mount controller or machinery unit in order to give access to the operator to operate the vehicle or machinery upon or after user breath sample is below toxic threshold setting of said remote breathalyzer processor circuitry.

Prior art teachings method using RFID tag or key fob methods used for user to operate a machinery fails to detect intoxicated person usage of a transponder key for operating a machinery, end of prior art teaching utilizes an RFID transponder that is operative by user voice recognition or speech recognition circuitry to engage the RFID circuitry to become operative to a preset time interval.

It is primary objection of the present invention is been compact in size. That the materials can be easily found on the market as shelve items and are inexpensive.

SUMMARY OF THE INVENTION

A hand held Remote Transponder Breathalyzer containing a battery as power supply to provide power to the breathalyzer sensor circuitry for converting given breath content into electronic signals; and a processor for storing a toxic breath setting, and processing the conditioned electronic signals, and for comparing the processed conditioned toxic breath setting threshold stored in the memory storage, and controlling the operation of a uniquely coded transponder circuitry.

When given breath processed conditioned electronic signals are substantially similar to one of below the toxic breath setting threshold. The processor upon receipt of the non-toxic electronic signal transmits a signal to activate for a preset time the functional operation of the transponder circuitry.

Wherein a vehicle or a machinery mount immobilizer CPU equipped with a RF transponder reader circuitry, being installed in a vehicle or a machine having a processor to store the uniquely coded remote transponder code, and to read the remote transponder code, and used for controlling the vehicle or machine immobilizer circuitry.

When a vehicle or machine operator presents the remote transponder breathalyzer to the vehicle or machine mount transponder reader, upon interrogation the vehicle or machine immobilizer processor receives the uniquely coded RF signal from the remote transponder, and accordingly release the vehicle or machine immobilizer interlock circuitry, to allow the sober driver to operator the vehicle.

The vehicle or machine mount immobilize unit of the present invention uses a processor designed to passively interlock the vehicle engine or machine when the vehicle's engine is turned off, to ascertain the vehicle or machine operator not be able to restart vehicle engine or the machine without the use of remote transponder breathalyzer.

The remote breathalyzer sensor circuit of the present invention additionally utilizing human breath sensor, or microphone circuitry to determine given human breath into remote breathalyzer, versus of given bogus air.

In a preferred embodiment of the present invention the Remote Transponder Breathalyzer additionally utilizes a voice recognition method, accordingly only given user be able to operate the remote transponder, which comprises of a microphone for converting spoken expression into electronic signals and a breathalyzer sensor for converting given breath content into electronic signals. An audio and breathalyzer sensor circuit for conditioning the electronic signals from the microphone and breathalyzer sensor; a memory storage for storing speech templates and toxic breath setting; a processor for processing the conditioned electronic signals and for simultaneously comparing the processed conditioned electronic signals with the speech templates, and the toxic breath setting threshold stored in said memory storage, the processor generating a signal to activate for a preset time functional operation of transponder circuitry, only when the processed conditioned electronic signals are substantially similar to one of the speech templates and below the toxic breath setting threshold. In the preferred embodiment of invention the remote transponder breathalyzer of present invention, contains additional built-in RF transmitter for remotely to lock/unlock vehicle doors, open truck, or start vehicle engine.

It is further embodiment of the present invention that the RFID transponder breathalyzer utilized in the present invention, in certain application may not require to contain a breathalyzer circuitry; therefore, the RFID transponder becomes operative based on user voice or speech recognition.

DETAILED DESCRIPTION OF THE INVENTION

Figure 1A:
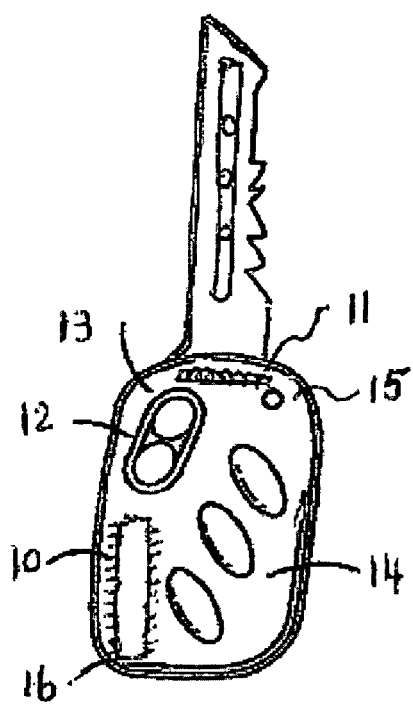
FIG. 1A. RFID transponder with built-in breathalyzer and key-fob.
Figure 1B:
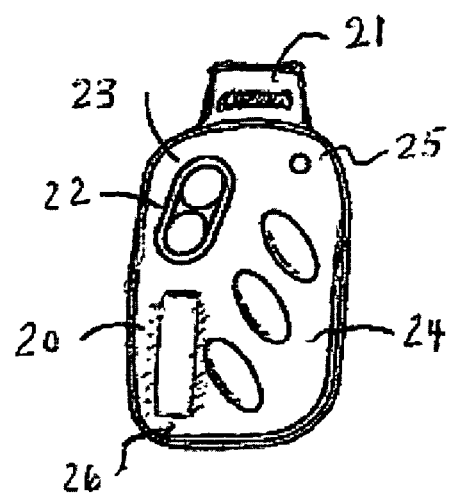
FIG. 1B. RFID transponder with built in breathalyzer.
Figure 2:
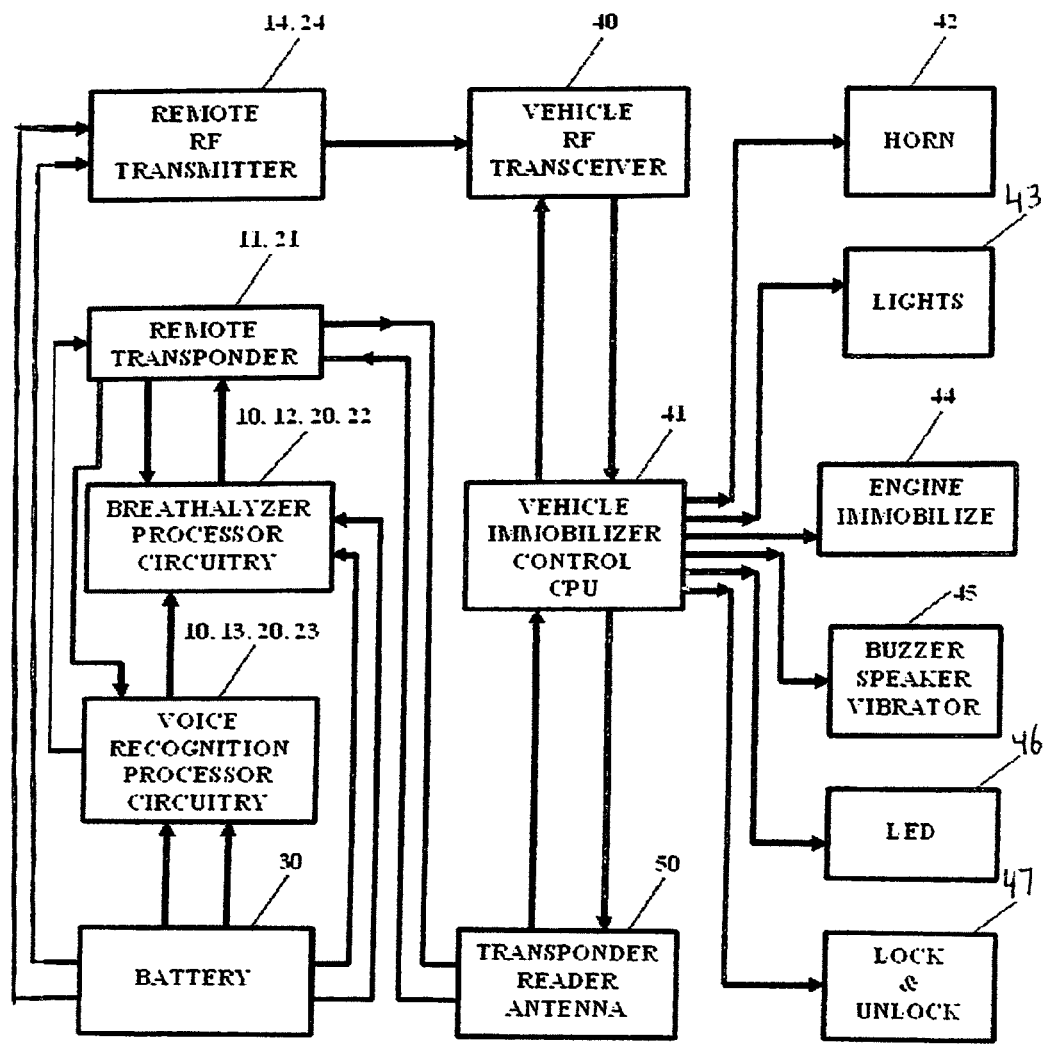
FIG. 2 Block Diagram

A hand held Remote Transponder Breathalyzer 16, 26 containing a battery 30 as power supply to provide power to the breathalyzer sensor circuitry 12, 22 for converting given breath content into electronic signals; and a processor 10, 20 for storing a toxic breath setting, and processing the conditioned electronic signals, and for comparing the processed conditioned toxic breath setting threshold stored in the memory storage, and controlling the operation of a uniquely coded transponder 11, 21 circuitry.

When given breath processed conditioned electronic signals are substantially similar to one of below the toxic breath setting threshold. The processor upon receipt of the non-toxic electronic signal transmits a signal to activate for a preset time the functional operation of the transponder circuitry 11, 21.

Wherein a vehicle or a machinery mount immobilizer CPU 41 equipped with a RF transponder reader circuitry 50, being installed on a vehicle or a machine having a processor to store the uniquely coded remote transponder 11, 21 code, and to read the remote transponder code, and used for controlling the vehicle or machine immobilizer circuitry 44.

When a vehicle or machine operator presents the Remote Transponder Breathalyzer 16, 26 to the vehicle or machine mount transponder reader 50, upon interrogation the vehicle or machine immobilizer processor 41 receives the uniquely coded RF signal from the remote transponder 11, 21, and accordingly release the vehicle or machine immobilizer interlock circuitry 44, to allow the sober driver to operator the vehicle.

The vehicle or machine mount immobilize control CPU 41 of the present invention uses a processor designed to passively interlock the vehicle engine or machine circuitry 44 when the vehicle's engine is turned off, to ascertain the vehicle or machine operator not be able to restart vehicle engine or the machine without the use of Remote Transponder Breathalyzer 16, 26.

The remote breathalyzer sensor circuit of the present invention utilizing human breath sensor circuitry 12, 22, or microphone 13, 23 circuitry to determine given human breath into remote breathalyzer 16, 26, versus of given bogus air.

In a preferred embodiment of the present invention the Remote Transponder Breathalyzer 16, 26 utilizes a voice recognition circuitry 13, 23, accordingly only given user be able to operate the remote transponder 11, 21 which comprises of a microphone 13, 23 for converting spoken expression into electronic signals and a breathalyzer sensor circuitry 12, 22 for converting given breath content into electronic signals. An audio 13, 23 and breathalyzer sensor circuit 12, 22 for conditioning the electronic signals from the microphone 13, 23 and breathalyzer sensor 12, 22; a memory storage for storing speech templates and toxic breath setting; a processor 16, 26 for processing the conditioned electronic signals and for simultaneously comparing the processed conditioned electronic signals with the speech templates, and the toxic breath setting threshold stored in said memory storage, the processor 10, 20 generating a signal to activate for a preset time functional operation of transponder circuitry 11, 21, only when the processed conditioned electronic signals are substantially similar to one of the speech templates and below the toxic breath setting threshold. In the preferred embodiment of invention the remote transponder breathalyzer 16, 26 of present invention, contains additional built-in RF transmitter 14, 24 for remotely to lock/unlock vehicle doors 47, open truck, or start vehicle engine 44. And the vehicle immobilizer control CPU of present invention utilizes a vehicle or machine mount LED 46 or buzzer 45 designed to provide user the immobilizer circuit 44 condition, and optionally the vehicle or machine control CPU 41 is connected to vehicle or machine lights 43 or horn 42 to indicate immobilizer system functional failure condition.

It is further embodiment of the present invention that the RFID transponder breathalyzer device 16, 26 may be utilized in certain application wherein it may not be require to contain a use of a breathalyzer circuitry 12, 22, therefore the RFID transponder 11, 21 becomes operative by user given voice or speech recognition.

The invention claimed is:

1. A hand held remote radio frequency identification (RFID) Transponder Breathalyzer device, comprising:
    a sensor configured to convert breath content of a user into electronic signals; and
    a processor configured to store a toxic breath setting in memory, process the electronic signals, compare the processed electronic signals with the stored toxic breath setting, and control functional operations of a transponder,
    wherein, when the electronic signals are substantially similar to one of or below the toxic breath setting threshold, the processor is further configured to complete circuitry of the transponder for a preset time such that the transponder functions during the preset time.

2. A hand held Breathalyzer, comprising:
    a processor configured to compare an electronic breath signal with a threshold breath signal to determine whether the electronic breath signal is below the threshold breath signal,
    wherein, when the electronic breath signal is below the threshold breath signal, the processor is further configured to complete circuitry of a transponder such that the transponder is configured to communicate with an apparatus for a predefined time period.

3. The hand held Breathalyzer of claim 2, wherein the processor is configured to decouple the circuitry of the transponder after the predefined time period to prevent the transponder from communicating with the apparatus.

4. The hand held Breathalyzer of claim 2, further comprising:
    a first sensor configured to convert breath content of a user into the electronic breath signal.

5. The hand held Breathalyzer of claim 2, further comprising:
    a second sensor configured to convert speech content of a user into an electronic speech signal.

6. The hand held Breathalyzer of claim 5, wherein the processor is further configured to determine whether the electronic speech signal matches to one of a plurality of speech templates in order to distinguish between the user of the hand held Breathalyzer and a non-user of the hand held Breathalyzer.

7. The hand held Breathalyzer of claim 6, wherein the plurality of speech templates are pre-recorded speech templates of the user of the hand held Breathalyzer.

8. The hand held Breathalyzer of claim 6, wherein, when the electronic speech signal matches one of the plurality of speech templates and the electronic breath signal is below the threshold breath signal, the processor is further configured to complete the circuitry of the transponder such that the transponder is configured to communicate with the apparatus for the predefined time period.

9. The hand held Breathalyzer of claim 5, wherein the processor is further configured to simultaneously compare the electronic breath signal with the threshold breath signal and the electronic speech signal with a plurality of speech templates to determine whether to complete the circuitry of the transponder.

10. The hand held Breathalyzer of claim 2, further comprising:
    memory comprising the threshold breath signal and a plurality of speech templates.

11. The hand held Breathalyzer of claim 2, wherein the apparatus comprises a vehicle, human operated machinery, or non-human operated machinery.

12. The hand held Breathalyzer of claim 2, further comprising:
- a transmitter configured to transmit at least one remote frequency (RF) signal to a receiver of a vehicle,
- wherein the at least one RF signal is configured to unlock and lock doors of the vehicle, open a trunk of the vehicle, or start an engine of the vehicle.

13. A breathalyzer, comprising:
- a processor; and
- a transponder comprising uncoupled circuitry,
- wherein the processor is configured to complete the circuitry of the transponder in order to activate functional operations of the transponder for a predefined time period when a first condition is satisfied.

14. The apparatus of claim 13, wherein the functional operations of the transponder cause the transponder to communicate with human operated machinery or non-human operated machinery for the predefined time period, after which the circuitry of the transponder is automatically decoupled.

15. The apparatus of claim 13, wherein the first condition is satisfied when an electronic breath signal is below a threshold breath signal.

16. The apparatus of claim 13, wherein the processor is configured to complete the circuitry of the transponder when the first condition is satisfied and a second condition is satisfied.

17. The apparatus of claim 13, wherein the second condition is satisfied when an electronic speech signal matches with one of a plurality of speech templates.

18. The apparatus of claim 13, wherein the processor is configured to complete the circuitry of the transponder in order to activate functional operations of the transponder for a predefined time period when the first condition and a second condition are simultaneously satisfied.

* * * * *